United States Patent [19]
Lenz et al.

[11] Patent Number: 5,940,144
[45] Date of Patent: Aug. 17, 1999

[54] DEVICE FOR REGULATING THE CONTRAST OF VIDEO IMAGES

[75] Inventors: Kuno Lenz, Saint Martin le Vinoux, France; Sigrid Hauser, San Diego, Calif.

[73] Assignee: Thomson multimedia S.A., Boulogne, France

[21] Appl. No.: 08/870,616

[22] Filed: Jun. 6, 1997

[30] Foreign Application Priority Data

Jun. 7, 1996 [FR] France .................................. 96 07045

[51] Int. Cl.⁶ .................................................. H04N 9/68
[52] U.S. Cl. ......................... 348/679; 348/645; 348/659
[58] Field of Search .................... 348/645, 647, 348/659, 678, 679, 690; H04N 9/68, 9/67

[56] References Cited

U.S. PATENT DOCUMENTS

| | | | |
|---|---|---|---|
| 4,679,072 | 7/1987 | Takayama | 348/659 |
| 4,980,756 | 12/1990 | Lagoni . | |
| 5,619,280 | 4/1997 | Yamashita | 348/645 |

FOREIGN PATENT DOCUMENTS

| | | |
|---|---|---|
| 0 375038 | 6/1990 | European Pat. Off. . |
| 0 589513 | 3/1994 | European Pat. Off. . |
| 0 677 972A2 | 10/1995 | European Pat. Off. . |

OTHER PUBLICATIONS

Patent Abstracts of Japan vol. 000, No. 000 & JP 06 337932 (NEC Corp) Dec. 6, 1994.

Patent Abstracts of Japan vol. 14, No. 391 (E–968), Aug. 23, 1990 & JP 02 145084 A (Hitachi), Jun. 4, 1990.

*Primary Examiner*—Sherrie Hsia
*Attorney, Agent, or Firm*—Joseph S. Tripoli; Peter M. Emanuel; Paul P. Kiel

[57] ABSTRACT

A device for regulating the luminance signal and chromanance signals of a video image to be converted into red, green and blue color signals. The device includes a conversion matrix and a device for regulating an amplitude of the luminance signal, the blue color difference chromanance signal and a red color difference chromanance signal to be modified by a user adjustment control. The device further includes a device for preventing the color signal having the highest value at the output of the conversion matrix from being able to exceed a saturation value substantially equal to a percentage, preferably 70%, of the white level of the image signal when the color signal reaches the saturation value.

14 Claims, 3 Drawing Sheets

DEVICE FOR REGULATING THE CONTRAST OF VIDEO IMAGES

BACKGROUND OF THE INVENTION

The invention relates to a device enabling the contrast level of a video image to be regulated.

As is known from those skilled in the art, a highly contrasted video image area prevents both the details of which it is composed and the details which surround it from being seen clearly. It is then necessary to decrease the contrast level so as to make the details reappear.

In the case, for example, of the displaying of a video image on a television screen, the viewer has available a contrast-level adjustment. In the case in which one or more areas of the image are too highly contrasted compared to the rest of the image, the viewer can therefore act on the contrast control so as to decrease the contrast.

The contrast control is applied by means of an adjustment parameter acting on circuits enabling the level of the luminance signal (Y), the level of the blue color difference chrominance signal (CB) and the level of the red colour difference chrominance signal (CR) to be simultaneously adjusted. As a result of simultaneous application of the user adjustment control, the darkest areas of the image are then no longer contrasted enough. It is the details of which these darkest areas are composed which are no longer visible.

The invention does not have these drawbacks.

SUMMARY OF THE INVENTION

The invention relates to a device enabling the luminance signal (Y) and the blue colour difference chrominance signal (CB) and the red colour difference chrominance signal (CR) of a video image to be converted into red (R), green (G) and blue (B) colour signals. The device comprises a conversion matrix and means enabling the amplitude of the luminance signal (Y) and of the blue color difference chrominance signal (CB) and of the red colour difference chrominance signal (CR) to be modified by means of a user adjustment control. The device comprises additional means which prevent the red (R), green (G) or blue (B) colour signal which has the highest value at the output of the conversion matrix from being able to exceed a saturation value equal to x % of the white level when the said colour signal reaches the said saturation value.

According to the preferred embodiment of the invention, the colour information which has the highest value at the output of the conversion matrix cannot exceed 70% of the value of the white level.

However, other values are possible according to other embodiments.

Advantageously, according to the invention, the limitation in contrast for high values of the luminance or red or blue colour difference signals makes it possible for the user to avoid making frequent contrast adjustments.

BRIEF DESCRIPTION OF THE DRAWINGS

Other characteristics and advantages of the invention will appear on reading a preferred embodiment, given with reference to the figures appended hereto, among which.

In all the figures, the same references denote the same elements.

DESCRIPTION OF THE PREFERRED EMBODIMENTS

Figure 1:
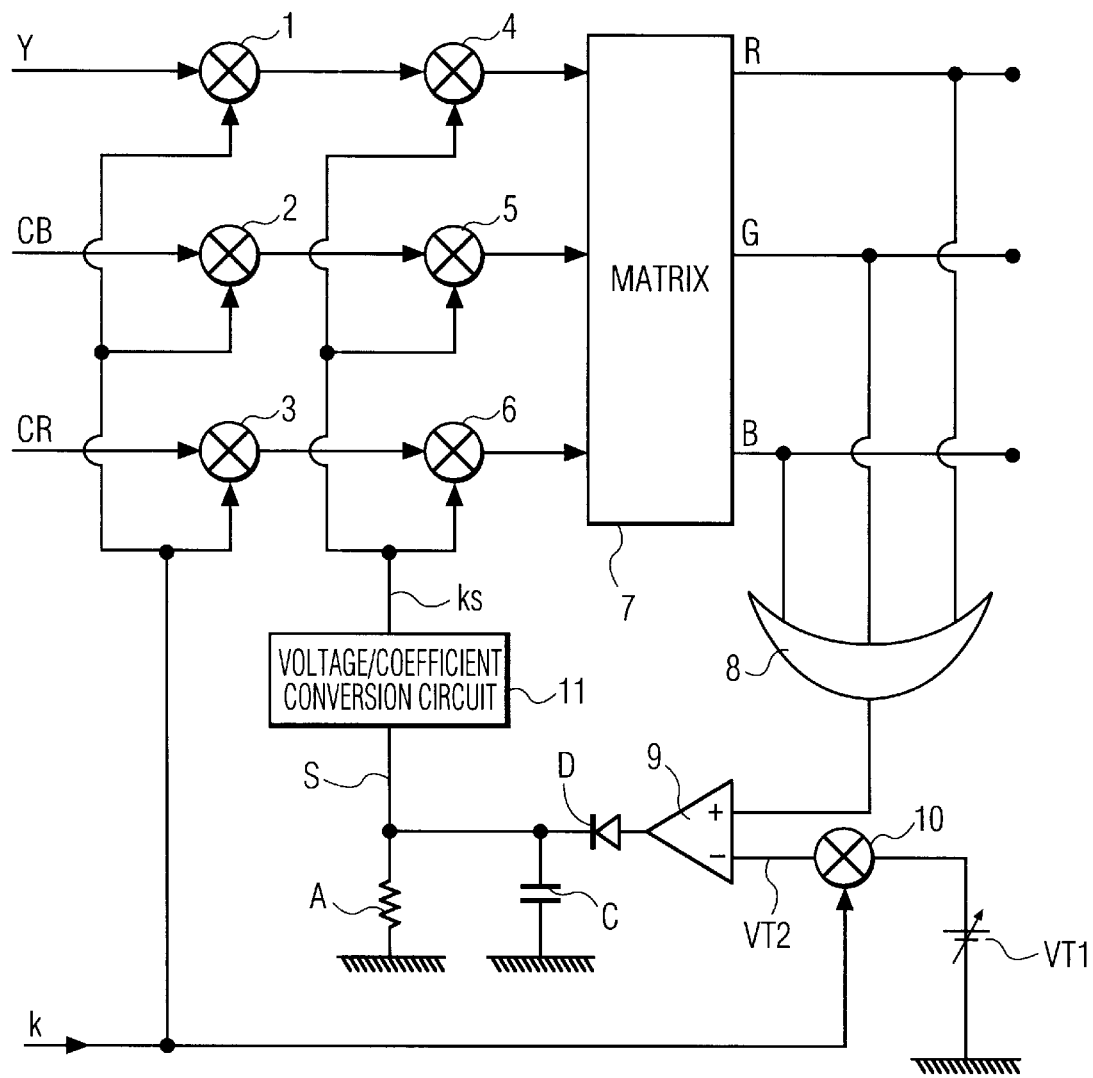
FIG. 1 represents a first embodiment of the regulating device according to the invention.

FIG. 1 represents a first embodiment of the regulating device according to the invention.

According to the invention, the regulating device makes it possible to adjust the level of the luminance component Y and of the blue CB and red CR colour difference chrominance components based on the detection of the maximum value assumed by one of the colour information items R, G, B coming from the matrix 7 whose function is to convert the Y, CB, CR components into R, G, B components.

The maximum value of R, G, B denoted hereafter by M(R, G, B), is detected using an OR function, referenced 8, having three inputs and one output. For this purpose, each of the R, G, B colour information items is applied at a different input of the OR function. The OR function 8 is produced by any known means. It may, for example, be a circuit produced using three diodes.

The output of the OR function is connected to the first input of a comparator 9. The value M(R, G, B) is therefore applied to the first input of the comparator 9, a second input of which receives a voltage VT2 from a multiplier 10. The voltage VT2 is equal to k times the voltage VT1, k being the user contrast-adjustment parameter and VT1 being a reference voltage whose value is preferably set in the factory. According to the invention, k is preferably between 0.25 and 1.

The variations in the output signal of the comparator 9 are applied via a diode D to the terminals of an integrating capacitor C. A resistor A is mounted in parallel with the capacitor C so as to ensure that the capacitor C discharges. The values of C and A are chosen so that the voltage S at the terminals of the capacitor C is substantially constant throughout the duration of at least one video image frame. By way of non-limiting example, the capacitor C may have a value of 500 nF and the resistor A a value of 680 kohms.

The output voltage S received at the terminals of the integrating capacitor C is applied to a voltage/coefficient conversion circuit 11 so as to generate a regulating coefficient ks. The voltage/coefficient conversion circuit 11 is produced in a manner known per se. There is therefore no point in recalling this here.

The regulating coefficient ks is applied simultaneously to the three control inputs of three multipliers 4, 5, 6, which receive on their respective inputs the signals k×Y, k×CB and k×CR from the three respective multipliers 1, 2 and 3, where k is the user contrast-adjustment parameter mentioned hereinabove. It follows that the luminance, blue colour difference and red colour difference signals applied at the input of the conversion matrix are respectively equal to:

ks×k×Y; ks×k×CB and ks×k×CR.

According to the invention, the coefficient ks preferably has a value of between 0.5 and 1.

Advantageously, the regulating operation is performed on the basis of any one of the three signals R, G or B.

Figure 2:
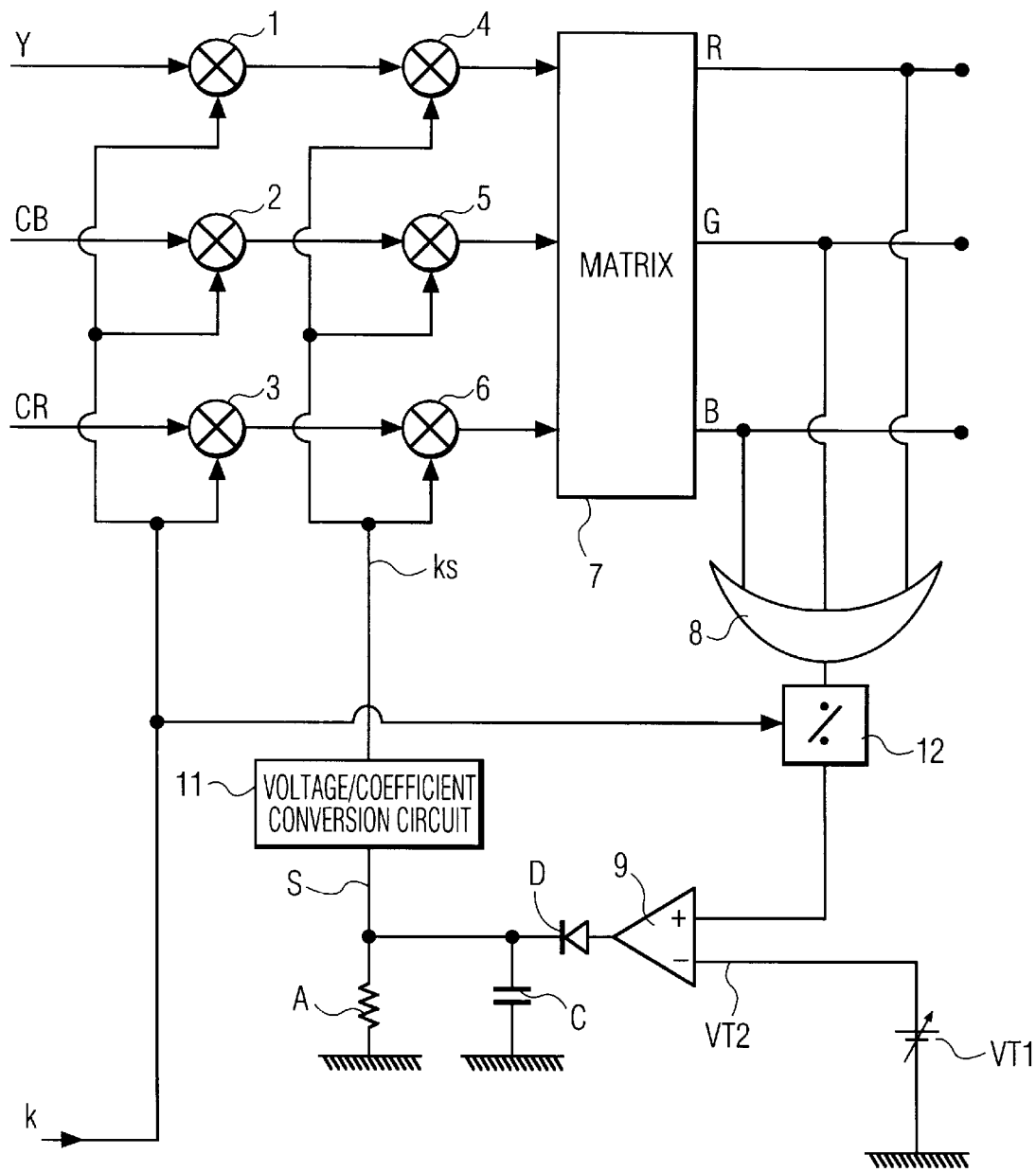
FIG. 2 represents a second embodiment of the regulating device according to the invention.

FIG. 2 shows a second embodiment of the regulating device according to the invention.

According to this second embodiment, the reference voltage VT1 is directly connected to the second input of the comparator and the output of the OR function 8 is connected to the input of a divider 12 whose output is connected to the first input of the comparator. The divider 12 is controlled by the user contrast-adjustment parameter k. It follows that the output voltage of the divider 12 is equal to the input voltage of the divider 12 divided by the quantity k.

All the other elements of the circuit in FIG. 2 are identical to those described in FIG. 1. It follows that the operation of the circuit described in FIG. 2 is in principle identical to that described in FIG. 1. However, in terms of production, the circuit described in FIG. 1 has the advantage of not requiring a divider to be produced. According to the circuit described in FIG. 1, the user adjustment coefficient k is applied to four multipliers 1, 2, 3 and 10. Preferably, these four multipliers may then be identical, which avoids complexifying the circuit. Advantageously, the action of k, on the one hand, on the signals Y, CB, CR and, on the other hand, on the signal M(R, G, B) is thus matched under optimal conditions.

Figure 3:
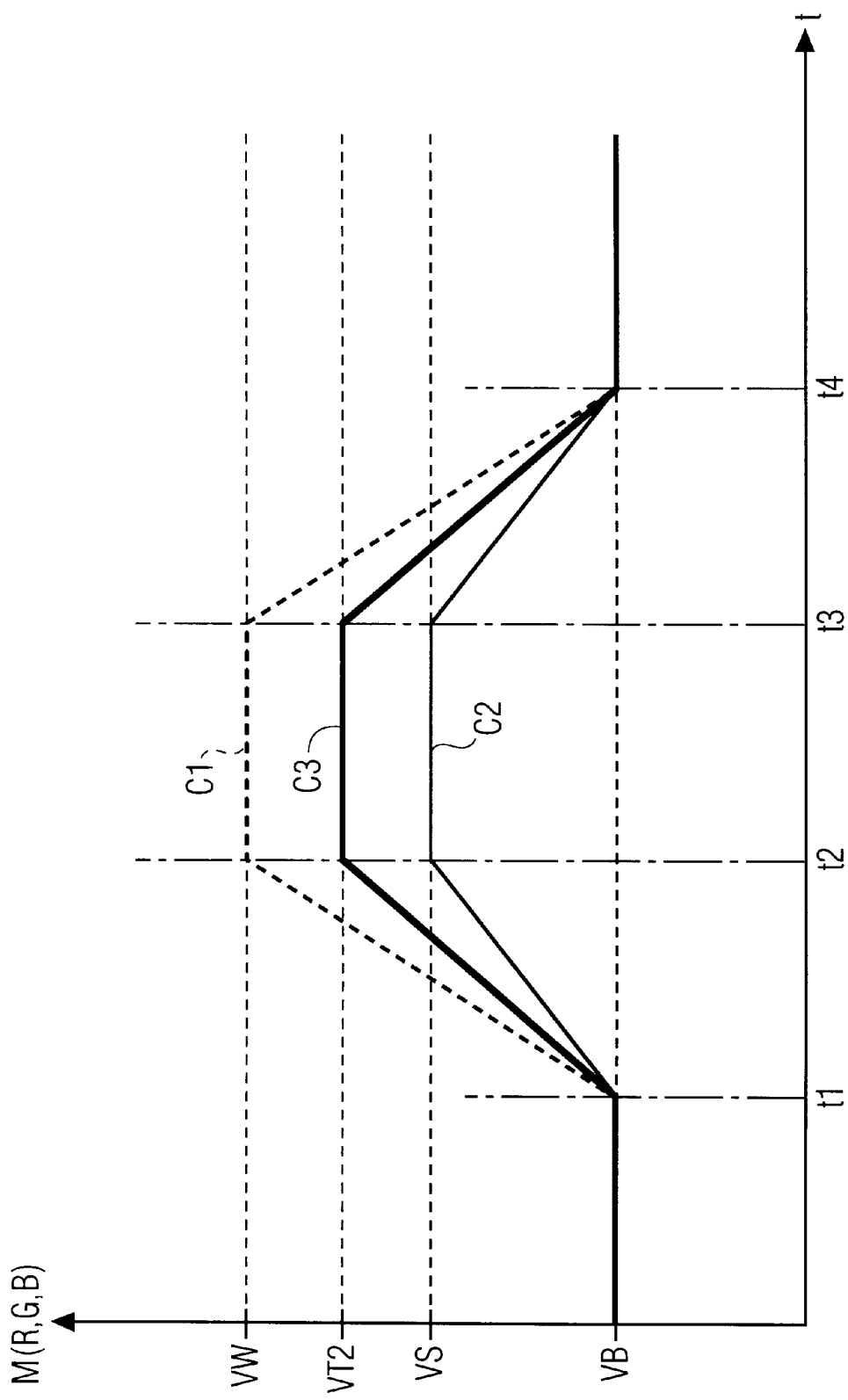
FIG. 3 represents the response curves of a device according to the prior art and of a device according to the invention.

FIG. 3 represents the response curves of a device according to the prior art and of a device according to the invention.

FIG. 3 comprises 3 curves, C1, C2 and C3. Curves C1 and C2 are response curves according to the prior art.

Curve C1 shows the phenomenon of saturation of the quantity M(R, G, B) when there is no adjustment of the contrast level.

The contrast variations shown by the change in curve C1 over time correspond to an example of video image reception. It is clear that any other type of contrast variations, corresponding to other examples of video image reception, is possible. According to the example shown by curve C1, the quantity M(R, G, B) goes from the black level VB at time t1 to the white level VW at time t2, remains at the white level between times t2 and t3 and goes from the white level VW at time t3 to the black level VB at time t4.

Curve C2 shows, by way of example, the saturation curve for the quantity M(R, G, B) between the black level VB and a saturation level VS fixed by the user.

The contrast variations shown by the change in curve C2 over time correspond to video image reception conditions identical to those for curve C1.

The saturation level VS is adjusted by the user by means of the regulating parameter k. If the image has highly contrasted areas, the user is obliged to reduce the contrast significantly. It follows that the level VS may be a level which greatly reduces the quantity M(R, G, B). When the image no longer has these highly contrasted areas, the user is then obliged to modify his adjustment again, so as to restore the contrast. For images whose contrast varies greatly, it may therefore be necessary for the user to have to modify the contrast a great many times.

Curve C3 shows, according to the invention, by way of example, the saturation curve for the quantity M(R, G, B) between the black level VB and the saturation level VT2.

The contrast variations shown by the change in curve C3 over time, correspond, by way of example, to video image reception conditions identical to those for curves C1 and C2.

Whatever the adjustment by the user, the quantity M(R, G, B) does not reach the value of the white level VW. Advantageously, the device according to the invention comprises means, such as those described in FIGS. 1 or 2, for automatic saturation of the quantity M(R, G, B) to be implemented so as to prevent the white level from being reached. This automatic saturation value is equal to VT2. As was mentioned previously, the value of VT2 corresponds to 70% of the white level VW. Advantageously, according to the device of the invention, it is then not necessary for the user to have to make as many adjustments as according to the prior art in order to obtain images whose contrast variations are not disagreeable to the eye.

The above description is made with reference to a color video image comprising the various colour information items R, G, B. For those skilled in the art, it is obvious that the words "luminance information" may replace the words "colour information" in the case where the invention applies to the processing of a black-and-white image and no longer of a colour image.

We claim:

1. Device enabling a luminance signal (Y), blue color difference chromanance signal (CB) and red color difference chromanance signal (CR) of a video image to be converted into red (R), green (G) and blue (B) color signals, said device comprising a conversion matrix (7) and means for (1, 2, 3) regulating an amplitude of the luminance signal (Y), the blue color difference chromanance signal and the red color difference chromanance signal based upon a user adjustment parameter, wherein said device further includes means (8, 9, 10, D, C, A, 11) for preventing a one of the red, green and blue color signals having a highest value at an output of said conversion matrix from exceeding a saturation value (VT2), said saturation value being equal to a percentage of a white level (VW) of the video image when said one of the red, green and blue color signals reaches said saturation value, said means for preventing comprises an OR function (8) having three inputs and an output, each of said three inputs being connected to a respective one of said red, green and blue color signal (R, G, B), a subassembly (9, 10, 12, D, C, A, 11) for generating a regulating coefficient (ks) based upon an output voltage of said OR function (8) and three multipliers (4, 5, 6), wherein each of said three multipliers being controlled by said regulating coefficient (ks) so as to modulate the amplitude of the luminance signal(Y), the amplitude of the blue color difference chromanance signal (CB) and the amplitude of the red color difference chromanance signal (CR), respectively.

2. Device according to claim 1, wherein said subassembly (9, 10, 12, D, C, A, 11) comprises a comparator (9) having a first input, a second input and an output, the first input of the comparator being connected to the output of the OR function (8) and the second input of the comparator being connected to the output of a multiplier (10) which is controlled by the user adjustment parameter (k) and the input of which is connected to a reference voltage (VT1).

3. Device according to claim 1, wherein said subassembly (9, 10, 12, D, C, A, 11) comprises a comparator (9) having a first input, a second input and an output, the first input of the comparator being connected to the output of a divider (12) controlled by the user adjustment parameter (k), input of the said divider being connected to the output of the OR function (8) and the second input of the comparator being connected to a reference voltage (VT1).

4. Device according to claim 2, wherein the user adjustment parameter (k) has a value of between 0.25 and 1 and in that the regulating coefficient (ks) has a value of between 0.5 and 1.

5. Device according to claim 3, wherein the user adjustment parameter (k) has a value of between 0.25 and 1, and in that the regulating coefficient (ks) has a value of between 0.5 and 1.

6. A device for regulating a contrast of a video image, comprising:

first means for adjusting an amplitude of a luminance signal, a blue color difference chromanance signal and a red color difference chromanance signal of the video image responsive to a user adjustment parameter;

means for converting said luminance signal, said blue color difference chromanance signal and said red color difference chromanance signal into red, green and blue color signals;

means for detecting a maximum value of said red, green and blue color signals outputted by said converting means; and second means, controlled by said user adjustment parameter, for adjusting the amplitude of said luminance signal, said blue color difference chromanance signal and said red color difference chromanance signal to prevent a maximum value of said red, green and blue color signals from exceeding a saturation value less than a white level.

7. The device according to claim 6, wherein said second means for adjusting comprises a subassembly for generating a regulating coefficient in response to the comparison between said maximum value of said red, green and blue color signals and a reference voltage; wherein the amplitude of said luminance signal, said blue color difference chromanance signal and said red color difference chromanance signal are adjusted as a function of said regulating coefficient and said user adjustment parameter.

8. The device according to claim 7, wherein said reference voltage is controlled by said user adjustment parameter.

9. The device according to claim 7, further comprising means for multiplying the luminance, blue color difference chromanance and red color difference chromanance signals by said regulating coefficient.

10. The device according to claim 7, wherein said detecting means comprises an OR function including three inputs and an output, each of said inputs being connected to receive a respective one of said red, green and blue color signals, and wherein said subassembly comprises a comparator having a first input, a second input and an output, said first input being connected to said output of said OR function, said second input being connected to a multiplier controlled by said user adjustment parameter, an input of the multiplier being connected to said reference voltage.

11. The device according to claim 7, wherein said detecting means comprises an OR function including three inputs and an output, each of said three inputs being connected to a respective one of said red, green and blue color signals; and wherein said subassembly comprises a comparator having a first input, a second input and an output, said first input being connected to the output of a divider controlled by said user adjustment parameter, an input of the divider being connected to the output of said OR function and said second input of said comparator being connected to said reference voltage.

12. The device according to claim 7, wherein said user adjustment parameter has a value substantially between 0.25 and 1.

13. The device according to claim 7, wherein said regulating coefficient has a value substantially between 0.5 and 1.

14. The device according to claim 6, wherein said saturation value is substantially 70% of a value of the white level.

* * * * *